(No Model.)
J. H. GARDNER.
COOKER.
No. 482,898. Patented Sept. 20, 1892.
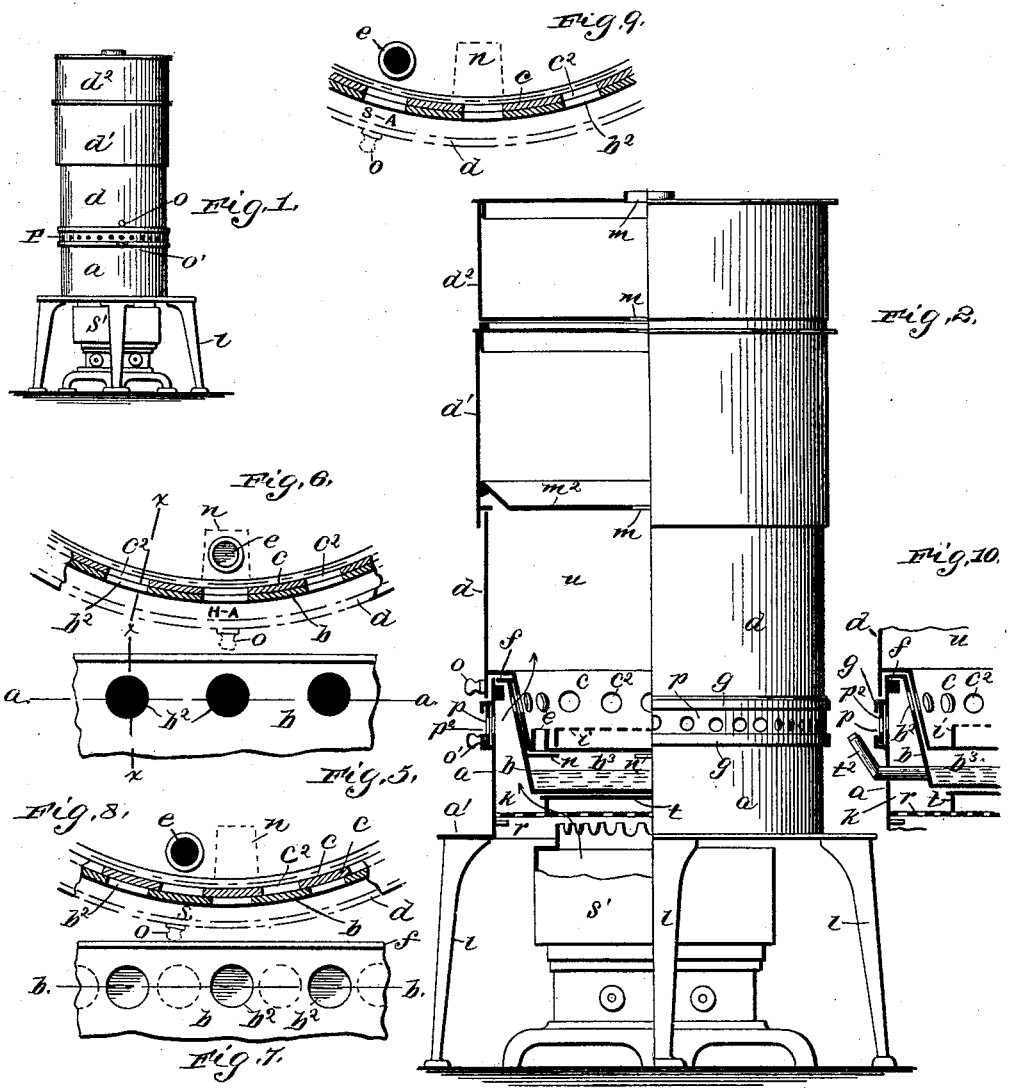
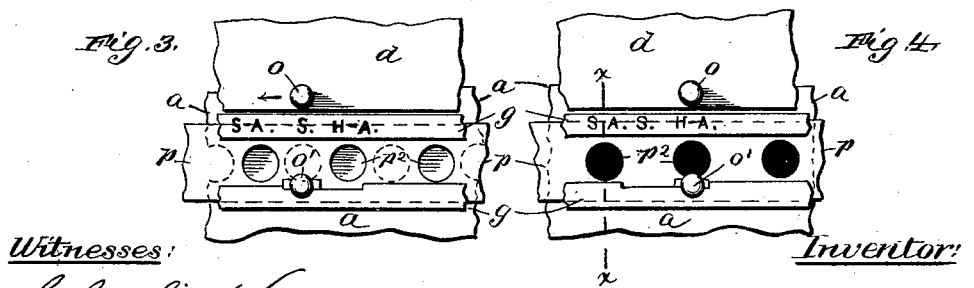
Witnesses:
Charles Hannigan
Ida M. Warren
Inventor:
John H. Gardner
by Remington & Henthorn
Attys.

UNITED STATES PATENT OFFICE.

JOHN H. GARDNER, OF PROVIDENCE, RHODE ISLAND.

COOKER.

SPECIFICATION forming part of Letters Patent No. 482,898, dated September 20, 1892.

Application filed November 20, 1891. Serial No. 412,510. (No model.)

*To all whom it may concern:*

Be it known that I, JOHN H. GARDNER, a citizen of the United States, residing at Providence, in the county of Providence and State of Rhode Island, have invented certain new and useful Improvements in Cookers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In United States Patent No. 460,860, granted to me October 6, 1891, I have shown and described a novel culinary appliance termed a "cooker." In that device the base thereof was provided with an annular pan or condenser partly filled with water, the space above the water being arranged to receive the gases and products of combustion from the cooking-chamber and conduct them into the waste-flue communicating with and leading from the condenser.

In my present cooker or stove the invention resides principally in the employment of a steam or water holding tank or vessel placed directly over the lamp or other source of heat, the sides being extended upwardly and provided with lateral openings communicating both with the hot-air chamber and oven or sectional cooking-chamber, combined with a shallower but similarly-apertured movable pan fitting said tank and having adjustable openings communicating with the steam-chamber, and an outer damper arranged for the passage into the outer air of the products of combustion from the hot-air chamber, all as will be more fully hereinafter set forth and claimed.

The object I seek to attain is to provide a cooker or portable stove with means whereby the temperature and also the humidity of the air within the cooking-chamber may be accurately controlled, the adjustment being easily and quickly effected from the outside of the cooker.

By means of my invention all the heated air may be conducted directly into the cooking chamber or oven. If it is desired to temper or lower the degree of the heated air, the same may be accomplished by simply opening the outer damper to the required extent, thereby allowing a portion of the heat to escape, the other portion then passing into the oven *via* the openings formed in the walls separating it from the hot-air chamber. At the same time, if need be, steam or vapor from the heated water-vessel may be allowed to pass upwardly into the oven by first uncovering the openings separating the vessel from the oven. From this it will be seen that the cooker is rendered adjustable by the use of the series of openings or dampers. At the same time by means of these openings it is readily convertible into a boiler, steamer, roaster, or stewer, as desired.

In the accompanying drawings, Figure 1 is a side elevation of my improved or adjustable cooker. Fig. 2 is a partial vertical central sectional view, enlarged. Fig. 3 is a partial side elevation, enlarged, showing the outer damper closed. Fig. 4 shows the damper open. Fig. 5 is a side view of a portion of the water-holding base, the hot-air passages being open. Fig. 6 is a corresponding horizontal sectional view taken on line $a\ a$ of Fig. 5, the steam-opening being closed. Fig. 7 is a side view of the same, showing the passages closed. Fig. 8 is a corresponding horizontal sectional view taken on line $b\ b$ of Fig. 7, the steam-passages being open. Fig. 9 is a similar sectional view, the hot-air and steam passages being open; and Fig. 10 is a partial vertical sectional view taken through the lower portion of the cooker or on lines $x\ x$ of Figs. 4, 5, and 6.

In the drawings, $a$ indicates the stationary base, the same being provided with a seating-flange $a'$ or otherwise adapted to be supported in position above an oil-stove $s'$ or any other suitable source of heat, the legs $l$ being used or omitted, as desired.

The cooker may be used on an ordinary coal-stove. In such case it is better to set it directly over one of the top holes, the legs $l$ being first removed. To the interior of the base $a$ is removably secured a perforated plate $r$, through which the heated air rises. On top of this plate loosely rests a deflector $t$, this latter being employed to divert the intense heat from the bottom of the water-vessel $b$, about to be described. The upper portion of the base $a$ is provided with a series of holes $p^2$ for the escape of hot air. A circular outer damper $p$, similarly perforated, is retained in position by upper and lower guides $g$, a knob $o'$ or other suitable device being employed to actuate the damper, as clearly shown in Figs. 2, 3, and 4.

The water-holding tank or vessel $b$ is preferably provided with inclined sides or walls, through the upper portion of which is formed a series of holes $c^2$. The bottom of this vessel lies in close proximity to the deflector $t$. The upper edge of the vessel is bent outwardly to form a flange $f$, which rests upon and is secured in any well-known manner to inner projections formed at the upper end of the base $a$. When thus arranged, there will be formed an annular space $k$ between the adjacent sides of the parts $a$ and $b$, which I term the "hot-air chamber." (See Figs. 2 and 10.)

Resting upon and supported by the base $a$ is the lower extension-collar $d$, provided with an exterior knob or handle $o$. To the lower portion of the collar is secured an interior vessel or dripping-pan $c$, having perforated inclined sides and fitting the water-holding vessel $b$, before described. The pan $c$ is shallower than the vessel $b$, thereby forming a steam space or chamber $b^3$ between them at the bottom.

$n$ indicates one or more narrow projections secured to the inner sides of the vessel $b$ contiguous to the bottom of the pan $c$, the bottom of the latter having a corresponding number of openings $e$ therein. By this arrangement steam or moisture from the chamber $b^3$ is prevented from passing upwardly into the cooking chamber or oven $u$ while the openings $e$ stand directly over the projections $n$, (see Figs. 2 and 6;) but upon turning the collar $d$ toward the right or left the openings $e$ are uncovered, thus placing the two chambers $b^3$ and $u$ in direct communication. Practically the openings $e$ are surrounded by annular walls thereby, to a certain extent, allowing the water of condensation, &c., to accumulate on the bottom of the pan without passing into the vessel beneath.

In Figs. 3 and 4 the stationary base $a$ is represented as having a series of letters or characters, viz: "H-A," "S," and "S-A." Now by turning the collar $d$ by means of the knob $o$ until the latter stands, say, just over H-A, as in Figs. 4 and 6, it will indicate to the attendant that the hot-air passages $c^2$ between the chambers $k$ and $u$ are open, the steam-openings being closed, (it being borne in mind that the vessel or pan $c$ is secured to and moves in unison with the collar $d$;) a further movement of the collar, say to the left, until the knob $o$ is over the letter S, as in Figs. 3 and 8, will fully close the hot-air passages $c^2$ and uncover the steam-openings $e$, and a still further movement in the same direction, or when the knob stands in line with the letters S-A, as in Fig. 9, will reopen the hot-air passages, thereby permitting both steam and hot air to enter the oven. During the adjustments of the several openings just described the amount of hot air passing to waste from the chamber $k$ may be controlled by means of the circular damper $p$, or it can be shut off altogether, if desired.

A second extension-collar $d'$ may be mounted on the top of the collar $d$, and is provided with a loose bottom $m^2$, as shown in Fig. 2. If desired, it may be surmounted by a warming-vessel $d^2$. For ventilating purposes, &c., center openings or flues $m$ may be employed, as in said Fig. 2.

As before stated, my improved cooker may be used for roasting or baking, boiling, steaming, &c., as desired. When it is employed for boiling purposes, the lower deflector $t$ may be removed. I provide the pan $c$ with a loose plate or false bottom $i$, the same being substantially level with the top of the steam-passages $e$. The vessel $b$ may be supplied with water from time to time, as desired, by means of a short tube $t^2$, extending through the base $a$, as indicated in Fig. 10, or the collar $d$, &c., may be removed bodily for the purpose.

By means of my improvement the amount of moisture in the cooking-chamber $u$ may be regulated and controlled to a nicety, thereby adapting the cooker to a greater variety of culinary operations. Another advantage obtained by the use of my improved cooker is that the food cooked therein is less liable to be "burned" or "dried up," because the attendant can by uncovering the steam-openings $e$ (to the extent desired) admit to the oven sufficient steam or vapor to prevent such objectionable results.

When the cooker is employed for the time being as a "steamer," as indicated in Figs. 3, 7, and 8, it is obvious that then the hot-air will flow into the outer air via the openings $p^2$, formed in the base $a$, the corresponding damper or register $p$ being first adjusted for the purpose.

I claim as my invention—

1. A portable cooker having a hot water or steam chamber at the bottom, an annular hot air chamber surrounding the walls of said steam-chamber, a cooking oven or compartment above the steam-chamber, and dampers for controlling the admission of steam and hot air or products of combustion, either combined or singly, from said chambers into the cooking-oven, substantially as described, and for the purpose set forth.

2. In a cooking apparatus, a hot-water chamber, a hot-air chamber surrounding the same, and a cooking chamber or oven arranged above and communicating with said chambers, in combination with means for regulating and cutting off the communication between the chambers, and a damper for controlling the admission of cold air into the hot-air chamber, or vice versa, as desired, substantially as hereinbefore described.

3. The cooker, substantially as hereinbefore described, consisting of the normally-stationary base portions $a$ $b$, having apertured sides separated from each other to form the annular hot-air chamber $k$, the axially-movable collar or extension $d$, having an apertured pan $c$, secured thereto and fitting into the base portion $b$ and forming a space $b^3$ between them, a cover or top for the collar, and a damper arranged to adjust the openings formed in the sides of the base $a$, all combined and adapted for operation substantially as set forth.

4. In a cooker provided interiorly with a hot-water chamber, a hot-air chamber, and a cooking chamber or oven and having adjustable openings communicating with said chambers for controlling the admission of steam and hot air into the said oven, the combination therewith of an exterior indicator or index arranged to show the relation of the several openings, substantially as hereinbefore described.

In testimony whereof I have affixed my signature in presence of two witnesses.

JOHN H. GARDNER.

Witnesses:
GEO. H. REMINGTON,
IDA M. WARREN.